United States Patent [19]

Goldstein

[11] Patent Number: 4,650,779

[45] Date of Patent: Mar. 17, 1987

[54] REGENERATION OF PILLARED CLAYS WITH GAS CONTAINING A SMALL AMOUNT OF AMMONIA

[75] Inventor: Theodore P. Goldstein, Yardley, Pa.

[73] Assignee: Mobil Oil Corporation, New York, N.Y.

[21] Appl. No.: 755,251

[22] Filed: Jul. 15, 1985

[51] Int. Cl.⁴ .................... B01J 21/20; B01J 38/08; B01J 38/12; B01J 38/06
[52] U.S. Cl. ........................... 502/38; 55/74; 208/113; 208/310 R; 502/54; 502/55
[58] Field of Search ............ 502/54, 55, 38, 41, 502/80, 84, 85, 86; 208/113, 310 R

[56] References Cited

U.S. PATENT DOCUMENTS

| 2,412,868 | 12/1946 | Brown | 502/54 |
| 4,043,938 | 8/1977 | Reif et al. | 502/55 |
| 4,176,090 | 11/1979 | Vaughan et al. | 502/84 |

FOREIGN PATENT DOCUMENTS 0134330  3/1985  European Pat. Off. ............ 502/54

Primary Examiner—P. E. Konopka
Attorney, Agent, or Firm—A. J. McKillop; M. G. Gilman; L. P. Hobbes

[57] ABSTRACT

The useful life of a deactivated inorganic pillared clay catalyst or an inorganic pillared clay sorbent saturated with a steam-distillable organic sorbate is extended by adding a small amount of ammonia to the regeneration gas or to the regeneration steam.

2 Claims, 1 Drawing Figure

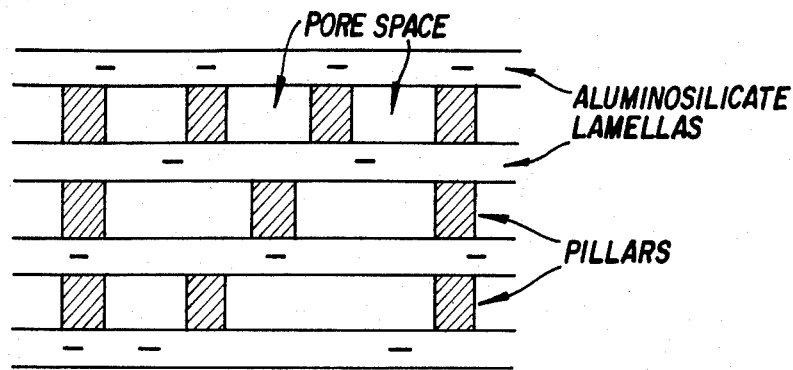
FIG.

REGENERATION OF PILLARED CLAYS WITH GAS CONTAINING A SMALL AMOUNT OF AMMONIA

FIELD OF THE INVENTION

This invention is concerned with pillared clays. It is particularly concerned with inorganic pillared clays that have become deactivated in use, either as sorbents for organic compounds, or as catalysts in an organic conversion reaction. It is more specifically concerned with an improved method for regenerating such spent pillared clays.

BACKGROUND OF THE INVENTION AND PRIOR ART

The term "pillared clays" as used herein refers to pillared natural and synthetic sheet-type (lamellar) silicates, and may properly be regarded as pillared derivatives of such lamellar precursors. The relationship of the structure and properties of the precursor materials to the structure and properties of the pillared derivatives are perhaps best shown by briefly considering the natural smectite clays and their pillared derivatives.

The natural smectite clay minerals have a structure consisting of superposed lamellas separated from each other by a layer of hydrated cations. Each of the lamellas is a two-dimensional polymeric oxyanion formed by two superficial layers consisting of tetrahedral sites bonded to a central layer of octahedral sites. The individual lamellas are about 9.6 A.U. thick. The 2:1 relation between the tetrahedral and octahedral layers within a lamella is characteristic of the smectite clays. Clays of the smectite type include montmorillonite, beidelite, nontronite, and others. The smectite clays have in common the property that they can undergo ion exchange, for example with acids, i.e. the intercalated cations are mobile. They also have the ability to intercalate metal complexes, organic species, and solvent such as water with increase in the interlayer distance. In some cases, such as with sodium montmorillonite immersed in water, the osmotic swelling leads to such large increase in the interlayer distance with concommitant decrease of interlamellar bonding force as to delaminate the clay. Such peptization is reversible.

It is evident from the foregoing description that the interlamellar distance in the natural smectites is variable and depends to a very large extent on the presence of liquid water. At 100° C. to 200° C., the interlamellar space decreases to about the thickness of a monolayer of water. Thus, the precursor materials do not have the well defined and fixed pore volume characteristic of inorganic sorbents and porous catalysts. The concept of pillaring smectite clays to create a porous network appears to have been first described by Barrer and MacLeod in *Trans. Farad. Soc.* Vol. 51, p. 1290 (1955), when they used tetraalkylammonium ions to limit the distance to which lamellas could be brought together. Since that time other pillaring agents have been proposed, including metal chelate complexes, and, most recently, polynuclear hydroxy metal cations. The use of oligomeric metal cations such as hydroxy aluminum and hydroxy zirconium cations can provide pillared phases with interlayer free spacings in the range of 5 to 20 A, and which are thermally stable above 500° C. in the absence of water vapor. Such materials are of interest as catalysts and catalyst supports for processing petroleum streams, and as sorbents. For a fuller description of pillared (and other modified) clay catalysts, the reader is referred to a publication by T. J. Pinnavaia in *Science*, Vol. 220, No. 4595, pp. 365-371 (Apr. 22, 1983), the entire content of which is incorporated herein by reference for background purposes.

The smectite clays are one example of a class of lamellar clays that lends itself to pillaring. Other types of expandable sheet-structure clay type minerals that also lend themselves to pillaring include vermiculite, nontronite, saponite, hectorite, biotite, magadiite, sauconite, bowlingite, and mixed-layer type minerals such as illite-montmorillonite, rectorite, allevardite, hydromicas, and others.

Pillared clays in general are recognizable because the basal plane distance (interlamellar spacing) remains essentially unchanged on progressive removal of water at elevated temperature. Basal plane distance is readily measured by X-ray diffraction, as is known to those skilled in the art. Furthermore, an outgassed pillared clay, free of sorbate, has a significant sorption capacity for organic compounds such as benzene. In general, a calcined clay well-pillared with thermally stable inorganic polymer will have an interlayer spacing of at least about 6 A.U. (Angstrom Units), and may range up to about 20 A.U. It will have a nitrogen BET surface area greater than about 100 $m^2/g$, and a nitrogen pore volume of about 0.1 to about 0.6 cc/g. U.S. Pat. No. 4,176,090 to Vaughan et al. and U.S. Pat. No. 4,238,364 to Shabtai describe such pillared clays and their utilities. These are incorporated herein by reference as if fully set forth.

As will be illustrated by example hereinbelow, clays pillared, for example with oligomeric hydroxy aluminum and hydroxy zirconium cations, have a serious deficiency. In the presence of steam at elevated temperature the rigid three-dimensional structure at least partially collapses with loss of pore volume. This limits the potential usefulness of such structures to catalytic applications in which no water is present, either in the feed or in the product, and to applications which do not require periodic regeneration of the catalyst by burning off coke deposits since such deposits contain hydrogen and burning generates steam. It also limits the use of such structures as sorbents to situations in which desporption with regeneration of active sorbent is conducted in the absence of steam.

It is an object of this invention to provide a method for extending the useful life of pillared clay catalysts and sorbents. It is a further object of this invention to provide a method whereby spent pillared clay catalysts are regenerated without loss of catalytic activity. It is a further object to provide a method for steam regeneration of a pillared clay sorbent without loss of sorption capacity.

BRIEF DESCRIPTION OF THE DRAWING

The FIGURE is a schematic representation of a pillared clay of the smectite variety.

DETAILED DESCRIPTION OF THE INVENTION

The method of this invention is simple. A pillared clay catalyst that has become deactivated in use concommitant with the accumulation of carbonaceous residue (coke residue) on the catalyst is regenerated by contact at elevated temperature with an oxygen-containing gas, such as air, that contains about 0.001 to 0.5 volume percent added gaseous ammonia. This method of regeneration very substantially reduces or eliminates the loss of activity that accompanies regeneration in the absence of added ammonia. While the reason for the effectiveness of the added ammonia is not known, one may speculate that the steam formed on burning the carbonaceous residue induces progressive collapse of the pillars and that this results in loss of pore volume and catalytic activity. By providing a non-acidic environment, the added ammonia counteracts the effect of the steam.

The method of this invention is particularly applicable to inorganic pillared clays that are deactivated in an acid-catalyzed conversion reaction, and particularly to an acid catalyzed hydrocarbon conversion since these reactions in general lead to deposition of coke and the need for periodic regeneration. Periodic regeneration is described in many patents, e.g. in U.S. Pat. No. 4,251,395 to Schwartz, which is incorporated herein by reference, and generally consists of contacting the deactivated catalyst with an oxygen containing gas at elevated temperature of about 1000° F. As used herein, the term "acid catalyzed hydrocarbon reaction" refers to a reaction known to be promoted by so-called acid catalysts. Catalytic cracking, hydrocracking, skelatal isomerization, catalytic dewaxing, and various aromatic hydrocarbon reactions such as alkylation, dealkylation, isomerization and disproportionation, are hydrocarbon conversion reactions which fall in the category of acid catalyzed reactions. Other reactions, such as alcohol dehydration, are also in this class.

Known inorganic porous solids such as silica-alumina, acid-treated clays, zeolites such as Zeolite X and Zeolite Y in the hydrogen form or in the divalent or polyvalent metal form, and other zeolites such as ZSM-5 are well known for their ability to catalyze the foregoing hydrocarbon conversion reactions. Such catalysts are known in the art as "acidic" catalysts. The term "acidic" as used herein will be applied to pillared clays which either as formed or as modified by ion-exchange with metal cations, exhibit catalytic activity for an acid-catalyzed reaction. The term "inorganic" as used herein means free of organic matter, i.e. an inorganic pillared clay has pillars which are formed of inorganic oxides or other inorganic species. Examples of pillared clays useful as catalysts and sorbents, and their modifications for catalytic purposes, are described in U.S. Pat. No. 4,176,090 incorporated by reference hereinabove. Cracking catalyst based on pillared smectites are described in U.S. Pat. No. 4,238,364 incorporated by reference hereinabove.

As is known in the art, the acid catalytic activity of a zeolite or other inorganic catalyst may be measured by its "alpha value", which is the ratio of the rate constant of a test sample for cracking normal hexane to the rate constant of a standard reference catalyst. Thus, an alpha value=1 means that the test sample and the reference standard have about the same activity. The alpha test is described in U.S. Pat. No. 3,354,078 and in the Journal of Catalysis, Vol. IV, pp 522–529 (August 1965), both of which are incorporated herein by reference. Measurement of the "alpha value" is useful to assess the extent of loss of catalyst activity encountered on regeneration or on exposure to steam. However, other conversions also may be used to assess catalytic activity.

It will be recognized by those skilled in the art that the catalyst regenerated by the method of this invention will be at least partially in the ammonium form. For purposes of this invention, it is usually preferred to remove the adsorbed ammonia, e.g. by calcining at about 538° C. for about 1 hour. Such treatment is usually regarded as effective to convert those catalytic sites which are in the ammonium form to the hydrogen form.

A section through a typical inorganic pillared smectite is shown schematically in the FIGURE. Shown therein are the negatively charged lamellas cross-linked with inorganic (such as alumina) pillars to form the fixed pore space. Metal or hydrogen cations (not shown) are located in the pore space. More or less than four lamellas may be present. Access to the pore space is probably through the edges of crystal rather than by penetration of the lamellas.

In another embodiment of this invention, a pillared clay sorbent that has become saturated with a steam-distillable organic sorbate that is free of aldehyde, ketone and carboxyllic acid substituents may be regenerated with steam that contains a small amount of ammonia to recover regenerated sorbent and separated sorbate. The presence of about 0.001 to 5 volume percent of ammonia added to the steam is very effective in lengthening the useful life of the sorbent. This method is particularly applicable to the preparation and recovery of natural and synthetic essential oils.

This invention will now be illustrated by examples which, however, are not to be construed as limiting the scope thereof, said scope being determined by this entire specification including the appended claims.

EXAMPLES

Example 1

A pillared clay was prepared according to the method described in U.S. Pat. No. 4,176,090 to Vaughan, et al., by treating a Volclay bentonite with a polymeric solution of basic aluminum chloride and sodium silicate at 150° F. for about one hour. The pH of the mixture was kept at 4.8 with periodic 3% NH$_4$OH additions. Upon completion of the treatment, the product was filtered, hot-water-washed and dried. Final calcination was at 1000° F. in air for two hours. The completion of the pillaring process was indicated by the large surface area of the product which was found to be 340 m$^2$/g, compared to 30 m$^2$/g for the base material. Its cyclohexane adsorption was 6.7% indicating relatively large pores. The chemical composition was found to be 55.2% SiO$_2$, 34.4 Al$_2$O$_3$, 0.21% Na and traces of other metals common to clay minerals.

Example 2

A portion of the pillared clay of Example 1 was treated at 538° C. with saturated steam for 18 hours. At the end of that time the catalytic activity for cracking normal hexane (alpha value) was measured, as was the alpha value of the unsteamed material. The unsteamed material was found to have an alpha value of about 2.0, while the steamed material had an alpha value of only 1.4, showing loss of catalytic activity.

Example 3

Another sample of the pillared clay of Example 1 was steamed under the same conditions as in Example 2 except that a small amount of the steam was generated from aqueous ammonia. After 38 hours the steamed catalyst was subjected to the usual precalcination at 538° C. before measuring the alpha value, which in this instance would cause desorption of adsorbed ammonia (i.e. conversion of the pillared clay to the hydrogen form), followed by contact with the normal hexane. Its alpha activity was found to be 1.9, i.e. about the same as the untreated pillared clay.

Example 4

A pellet of the pillared clay of Example 1 was used to sorb nitrobenzene vapor. The pellet was placed in a test tube and steam passed through the test tube. The condensate collected was a milky suspension and the presence of nitrobenzene was evident from its odor. Its presence was confirmed by its characteristic U.V. absorption spectrum.

Example 5

Cineole (Eucalyptol) was sorbed in a sample of the pillared clay of Example 1. Steam was then passed over the sorbent and the effluent was condensed. The recovered cineole separated from the water layer as a clear upper layer (its density being 0.92) and the characteristic eucalyptol odor noted. Cineole has a boiling point of 176°–177° C., but was readily recovered from the clay sorbent by distillation with steam at a temperature about 100° C.

What is claimed is:

1. In the method for regenerating a deactivated inorganic acidic pillared clay catalyst that contains coke residue acquired during an acid catalyzed hydrocarbon reaction, said regeneration being effected by contacting said deactivated catalyst with an oxygen containing gas at elevated temperature under conditions effective to remove said coke residues, the improvement whereby forming regenerated catalyst with minimal loss of catalytic activity which comprises including in said regeneration gas from about 0.001 to 5.0 volume percent of gaseous ammonia and heating said regenerated catalyst in air or an inert gas under conditions effective to desorb ammonia.

2. The method described in claim 1 wherein said hydrocarbon is a gas oil and said reaction is catalytic cracking.

* * * * *